United States Patent
Dong et al.

(10) Patent No.: US 9,508,020 B2
(45) Date of Patent: Nov. 29, 2016

(54) IMAGE PROCESSING SYSTEM WITH ARTIFACT SUPPRESSION MECHANISM AND METHOD OF OPERATION THEREOF

(71) Applicant: Sony Corporation, Tokyo (JP)

(72) Inventors: Xiaogang Dong, Boyds, MD (US); Jiro Takatori, Cupertino, CA (US); Tak-Shing Wong, Fremont, CA (US)

(73) Assignee: Sony Corporation, Tokyo (JP)

(*) Notice: Subject to any disclaimer, the term of this patent is extended or adjusted under 35 U.S.C. 154(b) by 378 days.

(21) Appl. No.: 14/333,393

(22) Filed: Jul. 16, 2014

(65) Prior Publication Data
US 2016/0019677 A1 Jan. 21, 2016

(51) Int. Cl.
G06K 9/46 (2006.01)
G06K 9/52 (2006.01)
G06T 5/00 (2006.01)
G06T 5/10 (2006.01)
G06K 9/40 (2006.01)

(52) U.S. Cl.
CPC . *G06K 9/52* (2013.01); *G06K 9/40* (2013.01); *G06T 5/002* (2013.01); *G06T 5/10* (2013.01); *G06T 2207/20021* (2013.01); *G06T 2207/20048* (2013.01)

(58) Field of Classification Search
CPC .......... G06K 9/52; G06K 9/40; G06T 5/002; G06T 5/10
USPC ....... 382/170, 171, 190, 195, 260, 274, 275; 358/3.26, 3.27, 537, 538, 452, 463
See application file for complete search history.

(56) References Cited

U.S. PATENT DOCUMENTS

| | | | |
|---|---|---|---|
| 5,819,035 A | 10/1998 | Devaney et al. | |
| 5,852,475 A | 12/1998 | Gupta et al. | |
| 5,870,503 A | 2/1999 | Kumashiro | |
| 5,920,356 A | 7/1999 | Gupta et al. | |
| 6,122,119 A * | 9/2000 | Omori | G11B 5/012 360/31 |
| 6,249,321 B1 * | 6/2001 | Bae | H04N 5/211 348/607 |
| 6,427,031 B1 | 7/2002 | Price | |
| 6,876,935 B2 * | 4/2005 | Kamitani | G01R 35/005 702/65 |
| 7,570,782 B2 * | 8/2009 | Seroussi | G06T 1/0035 382/100 |
| 7,865,807 B2 * | 1/2011 | Lablans | H03M 13/095 714/781 |
| 8,615,034 B2 * | 12/2013 | Kitagaki | H04N 5/357 375/224 |
| 8,645,803 B2 * | 2/2014 | Lablans | H03M 13/1515 714/746 |

OTHER PUBLICATIONS

Hu et al., "Removal of Blocking and Ringing Artifacts in Transform Coded Images", "International Conference on Acoustics, Speech, and Signal Processing", Apr. 1997, pp. 2565-2568, vol. 4, IEEE.
Liew et al., "Blocking Artifacts Suppression in Block-Coded Images Using Overcomplete Wavelet Representation", "IEEE Transactions on Circuits and Systems for Video Technology", Apr. 2004, pp. 450-461, vol. 14, No. 4, IEEE.

* cited by examiner

*Primary Examiner* — Yosef Kassa
(74) *Attorney, Agent, or Firm* — Haverstock & Owens LLP (57) ABSTRACT

An image processing system, and a method of operation thereof, includes: a local patch ternarization module for receiving an input image, for calculating a mean value of a local patch of pixels in the input image, and for calculating ternary values for the pixels based on the mean value; and an artifact removal module, coupled to the local patch ternarization module, for removing a residue artifact based on the ternary values and for generating an output image with the residue artifact removed for sending to an image signal processing hardware.

20 Claims, 6 Drawing Sheets

IMAGE PROCESSING SYSTEM WITH ARTIFACT SUPPRESSION MECHANISM AND METHOD OF OPERATION THEREOF

TECHNICAL FIELD

The present invention relates generally to an image processing system and more particularly to a system for image processing with transformation domains.

BACKGROUND ART

Digital images and video frames can usually include many undividable spatial elements arranged in rectangle shapes. These elements can be called "pixels". In today's typical applications, a number of the pixels in the images and video frames can range from tens of thousands to tens of millions. Each of the pixels can include one or more values. For example, each of the pixels can include one value in greyscale images, three values in color images, and dozens of values in hyperspectral images.

Spatial domain representation of the images and video frames can generally record pixel values in raster order including left-to-right then top-to-bottom. Two popular spatial domain representations can include bitmap (BMP) images and uncompressed audio-video-interleave (AVI) videos. The spatial domain representation can retain all details of the images and video frames but can demand large data sizes.

Alternatively, the images and video frames can be represented as a linear combination of special functions. The functions can usually be perpendicular to each other and can be called "basis functions". Instead of recording the pixel values, coefficients of the basis functions can be recorded to represent the images and video frames. Such representation can be called "transformation domain representation" of the images and video frames.

A process to obtain the transformation domain representation of the images and video frames can be called "image transform". Popular image transforms can include, but not limited to, Fourier transforms, local cosine transforms, and wavelet transforms.

The Fourier transforms can represent the images and video frames as linear combinations of sine and cosine functions. The local cosine transforms can partition the images and video frames into blocks of certain sizes, and the pixel values can become linear combinations of cosine functions inside each block. The wavelet transforms can represent the images and video frames as linear combinations of wavelet basis functions.

The transformation domain representations of the image and video frames can generally be "sparse". In other words, many coefficients of the basis functions can be either zero or very close to zero. The "sparse" property of the transformation domain representation can be widely used in many important image and video applications, such as compression, denoising, demosaicing, etc.

In image and video compression, in order to reduce data storage and transmission requirements, certain image data can be selectively discarded to reduce an amount of data needed to represent the image while avoiding substantial degradation of an appearance of the image. The image and video compressions can generally be conducted on transformation domains. Transform coefficients can be suppressed to zero or individually quantized to reduce an amount of data that is needed to represent the image.

Image compression methods can be widely implemented in capture devices, such as cameras, camcorders, smart phones, and tablets, as examples. If the image transforms can be applied at an encoder side of the image and video compressions, residue artifacts can often be observed after decompression at a decoder side, which is a main drawback of the image and video compressions. Such residue artifacts can generally resemble the basis functions and can be more visible when bitrates are low or file sizes are small. To ensure satisfying images or videos, it is an important task to suppress such residue artifacts on the decoder side.

The digital images and video frames can often be corrupted by various noises, such as shot noise, thermal noise, quantization noise, etc. Image denoising is a process to suppress these noises and improve image and video quality. Most of modern color imaging sensors can only capture one color per pixel location and can rely on nearby pixels' information to recover values of the other two colors. A process to recover full resolution color information can be called "demosaicing". Denoising and demosaicing can be two essential steps in most of today's digital cameras including, but not limited to, point-and-shoot cameras, single-lens-reflex (SLR) cameras, camcorders, mobile phone cameras, and tablet cameras.

Transformation domain methods, especially wavelet transforms, can often be applied in image denoising and demosaicing tasks to achieve better image and video qualities. One particular downside of wavelet-based denoising and demosaicing can relate to the residue artifacts. Therefore, it is an essential step to suppress such residue artifacts.

Thus, a need still remains for an image processing system that can deliver good picture quality and features across a wide range of device with different sizes, resolutions, and connectivity. In view of the increasing demand for providing video on the growing spectrum of intelligent devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system including: receiving an input image; calculating a mean value of a local patch of pixels in the input image; calculating ternary values for the pixels based on the mean value; removing a residue artifact based on the ternary values; and generating an output image with the residue artifact removed for sending to an image signal processing hardware.

The present invention provides an image processing system, including: a local patch ternarization module for receiving an input image, for calculating a mean value of a local patch of pixels in the input image, and for calculating ternary values for the pixels based on the mean value; and an artifact removal module, coupled to the local patch ternarization module, for removing a residue artifact based on the ternary values and for generating an output image with the residue artifact removed for sending to an image signal processing hardware.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof Referring now to FIG. 1, therein is shown an example of a block diagram of an image processing system 100 with an artifact suppression mechanism in an embodiment of the present invention. The image processing system 100 can be used to acquire, store, compute, communicate, and display information including images and videos.

Figure 1:
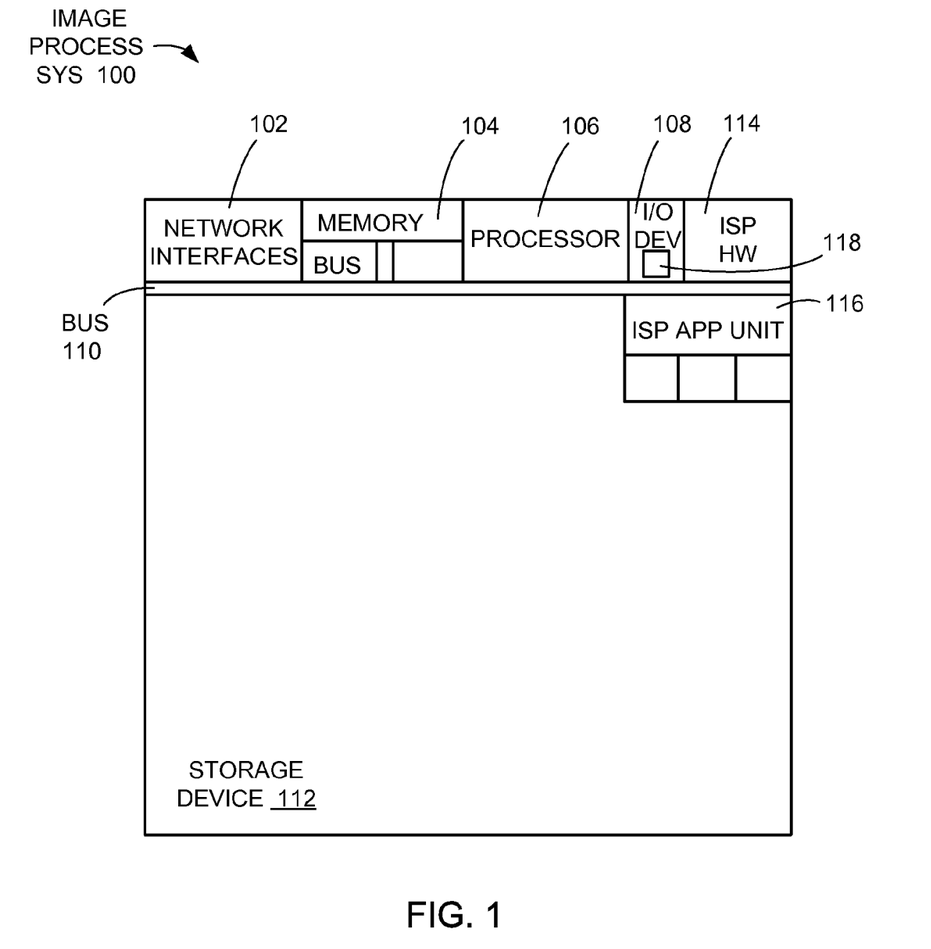
FIG. 1 is an example of a block diagram of an image processing system with an artifact suppression mechanism in an embodiment of the present invention.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and a flash memory card. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units including a circuitry, a processor, an integrated circuit, and integrated circuit cores. The image signal processing application unit 116 can include software including machine code, firmware, embedded code, and application software.

For example, the degradations can occur due to blur introduced by camera optics, color cast due to illuminant, exposure compensation for high dynamic range images, noise from the signal and circuitry, gain applied to compensate for low light. Also for example, the blur can be due to artifacts introduced in a camera pipeline by operations including demosaicing. In some embodiments, information used to determine the degradations can be stored in a lookup table in the memory 104, the storage device 112, or a combination thereof The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Point-and-shoot cameras, video camcorders, single-lens reflex (SLR) cameras, mirrorless cameras, and cameras in mobile devices.

At each pixel or an image region, the image signal processing hardware 114, the image signal processing application unit 116, or a combination thereof can find an estimate of degradations that degrades the image. In some embodiments, the degradations can be determined pixel by pixel and in other embodiments, portions of the images or the videos larger than a pixel can be used to determine the degradations. Methods and systems described herein can be applied to computer vision, machine learning, and image restoration applications including super-resolution, in-painting, texture synthesis, segmentation, object/scene/texture categorization, and other image and video processing implementations.

The input/output devices 108 can include display devices 118 to display image information. The display devices 118 are units that present visual representations of images or any visual information.

Figure 2A:
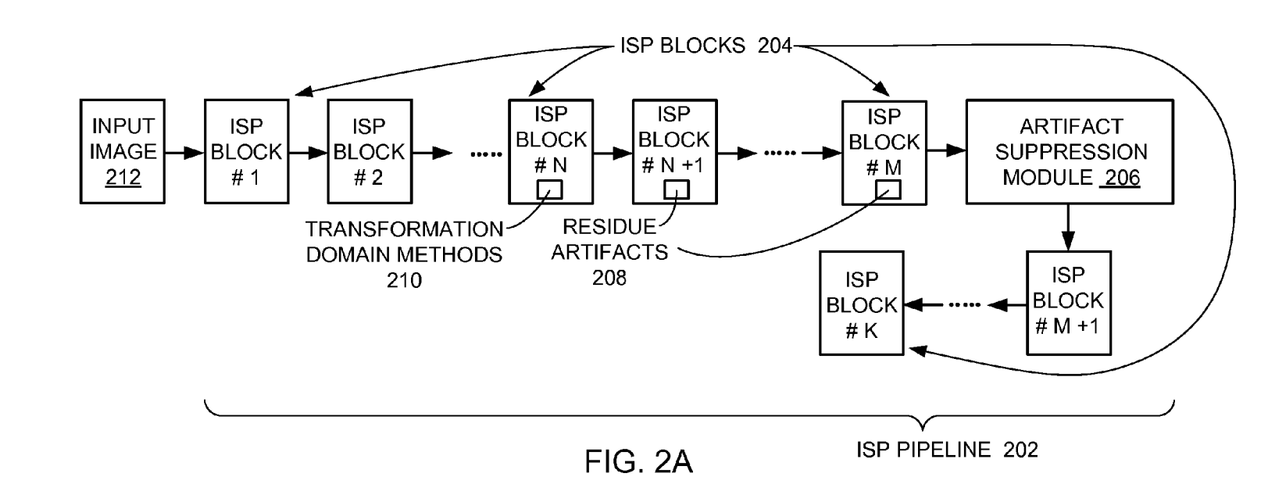
FIG. 2A is a first example of an image signal processing pipeline of the image processing system of FIG. 1.

Referring now to FIG. 2A, therein is shown a first example of an image signal processing pipeline 202 of the image processing system 100 of FIG. 1. The image signal processing pipeline 202 can include any number of image signal processing blocks 204.

The image signal processing blocks 204 can be implemented with the image signal processing hardware 114 of FIG. 1, the image signal processing application unit 116 of FIG. 1, or a combination thereof. For example, FIG. 2A depicts a number of the image signal processing blocks 204, denoted as ISP block #1, ISP block #2, . . . , ISP block #N, ISP block #N+1, . . . , ISP block #M, ISP block #M+1, . . . , and ISP block #K, where N<M<K, and N, M, and K are counting numbers.

The image processing system 100 can include an artifact suppression module 206 between and connected to two of the image signal processing blocks 204. The artifact suppression module 206 can be connected to any of the image signal processing blocks 204 in the image signal processing pipeline 202. For example, the artifact suppression module 206 is shown between and connected to ISP block #M and ISP block #M+1.

One or more of the image signal processing blocks 204 can use or include a transformation domain image processing technique, which can cause residue artifacts 208 in an image or a video. The artifact suppression module 206 can be used to identify and suppress or remove the residue artifacts 208.

The residue artifacts 208 are portions of media, including images and video, which are distorted and caused by application of transformation domain methods 210. The residue artifacts 208 can be visually noticeable. The transformation domain methods 210 are processes that are used to achieve better or improved noise suppression in denoising applications and better or improved reproduction in image demosaicing applications.

In addition, the transformation domain methods 210 can be applied to image/video compression applications. For the image/video compression applications, the transformation domain methods 210 are processes that encode information using fewer bits than the original representation. The transformation domain methods 210 can be employed for data compression, source coding, bit-rate reduction, or transform coding.

The image processing system 100 can include an input image 212 to be processed by the image signal processing pipeline 202. The image processing system 100 can include two different situations or scenarios. FIG. 2A describes a first scenario, and a second scenario will subsequently be described. For example, FIG. 2A depicts the input image 212 without any of the residue artifacts 208.

In the first scenario, one of the image signal processing blocks 204 can apply the transformation domain methods 210, and then the rest of the image signal processing pipeline 202 can suffer from or affected by the residue artifacts 208. Denoising and demosaicing applications can mostly fall or apply in the first scenario.

For example, ISP block #N can apply the transformation domain methods 210. Then, the following ISM blocks after ISP block #N can be affected by the residue artifacts 208. Also for example, the artifact suppression module 206 can be immediately after ISP block #M or any of ISP blocks after ISP block #M. After the artifact suppression module 206, remaining ISM blocks can no longer suffer from or affected by the residue artifacts 208.

Figure 2B:
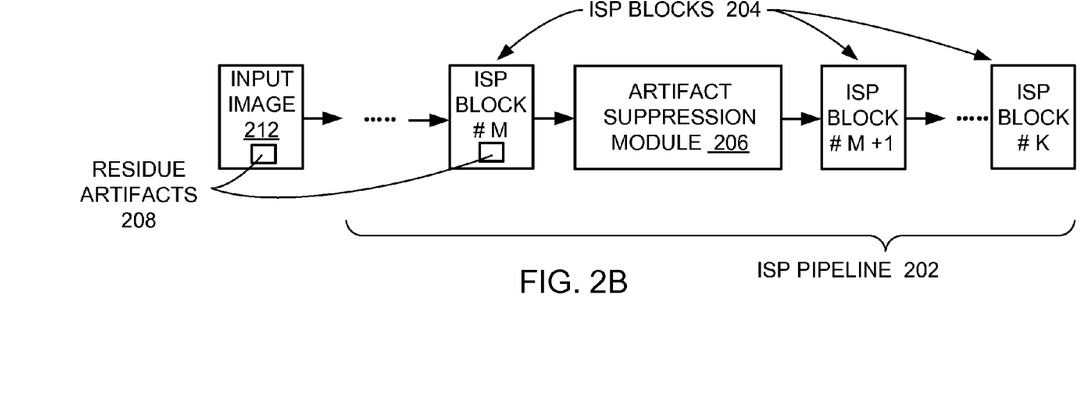
FIG. 2B is a second example of the image signal processing pipeline of the image processing system of FIG. 1.

Referring now to FIG. 2B, therein is shown a second example of the image signal processing pipeline 202 of the image processing system 100 of FIG. 1. The image signal processing pipeline 202 can include any number of image signal processing blocks 204.

The image signal processing blocks 204 can be implemented with the image signal processing hardware 114 of FIG. 1, the image signal processing application unit 116 of FIG. 1, or a combination thereof. For example, FIG. 2B depicts a number of the image signal processing blocks 204, denoted as ISP block #M, ISP block #M+1, . . . , and ISP block #K, where M<K, and M and K are counting numbers.

The image processing system 100 can include the artifact suppression module 206 between and connected to two of the image signal processing blocks 204. The artifact suppression module 206 can be connected to any of the image signal processing blocks 204 in the image signal processing pipeline 202. For example, the artifact suppression module 206 is shown between and connected to ISP block #M and ISP block #M+1.

In the second example, the image signal processing blocks 204 may not use or include the transformation domain methods 210, which can cause the residue artifacts 208. The artifact suppression module 206 can be used to identify and suppress or remove the residue artifacts 208.

FIG. 2B describes the second scenario. In the second scenario, the input image 212 of a sub-system of the image processing system 100 can already include the residue artifacts 208. The sub-system that generates the input image 212 can be outside of the image signal processing pipeline 202.

Denoising and demosaicing applications can mostly fall or apply in the first scenario, while a decoder of compression applications can belong to or apply in the second scenario if an encoder of the compression applications can apply the transformation domain methods 210. Sometimes, the input image 212 can already include the residue artifacts 208 because another system or the sub-system can process the input image 212 using the transformation domain methods 210.

For example, the encoder in image/video compression applications can apply the transformation domain methods 210. Then, the input image 212 to the decoder can already include the residue artifacts 208 before the input image 212 is provided to the image signal processing pipeline 202.

Figure 3:
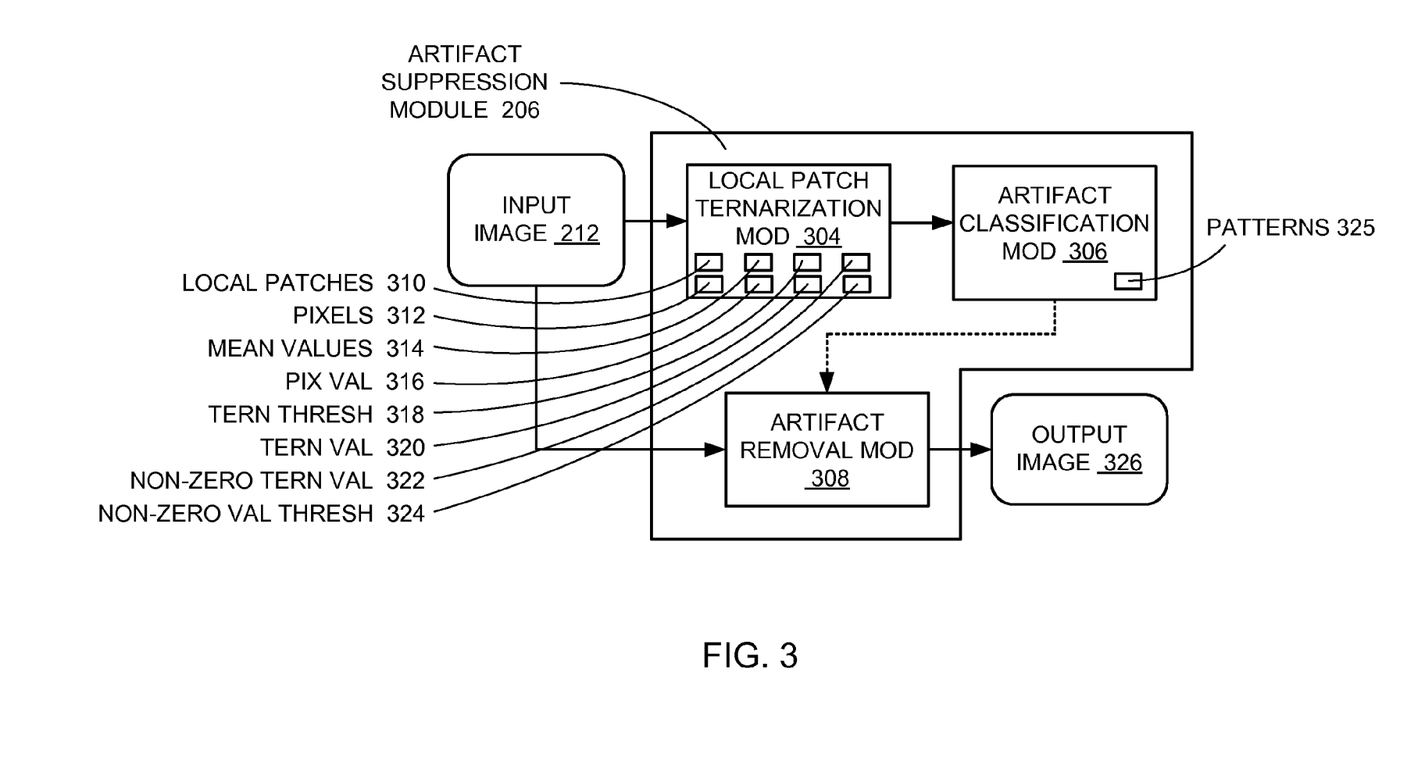
FIG. 3 is a detailed block diagram of the artifact suppression module.

Referring now to FIG. 3, therein is shown a detailed block diagram of the artifact suppression module 206. The artifact suppression module 206 can include a proposed method of suppressing transformation domain residue artifacts or the residue artifacts 208 of FIG. 2.

The artifact suppression module 206 can be implemented in the image processing system 100 of FIG. 1. The artifact suppression module 206 can remove the residue artifacts 208 that are due to the transformation domain methods 210 of FIG. 2.

For example, the transformation domain methods 210 can be employed for various image and video applications or processing tasks, such as denoising, demosaicing, compression, etc. Also for example, the transformation domain methods 210 can include Fourier transform, cosine transform, and wavelet transform.

The artifact suppression module 206 can receive the input image 212 generated from one of the image signal processing blocks 204 of FIG. 2 in the image signal processing pipeline 202 of FIG. 2. The input image 212 can include the residue artifacts 208 after applying such transformation domain processing technologies or the transformation domain methods 210. The residue artifacts 208 can resemble basis functions of the transformation domain methods 210. The input image 212 can be from one of previous blocks or the image signal processing blocks 204 or from another system, as shown in FIGS. 2A-2B.

For example, in mathematics, the basis functions can include an element of a particular basis for a function space. Every continuous function in the function space can be represented as a linear combination of the basis functions, just as every vector in a vector space can be represented as a linear combination of basis vectors. In linear algebra, a basis can include a set of linearly independent vectors that, in a linear combination, can represent every vector in a given vector space or a coordinate system.

The artifact suppression module 206 can include a local patch ternarization module 304, an artifact classification module 306, and an artifact removal module 308. The local patch ternarization module 304 can be coupled to the artifact classification module 306 and one of the image signal processing blocks 204.

The artifact classification module 306 can be coupled to the artifact removal module 308. The artifact removal module 308 can be coupled to another of the image signal processing blocks 204 in the image signal processing pipeline 202.

The local patch ternarization module 304 receives the input image 212 from one of the image signal processing blocks 204 or the sub-system. The local patch ternarization module 304 selects local patches 310 of pixels 312. The local patches 310 are a group of the pixels 312 that are located immediately next to each other.

The pixels 312 are smallest picture elements or units of an image. The pixels 312 can be used to refer to a resolution of a captured and stored image in a data file. For example, a 4-kilopixel or 4K video can be displayed on a high-definition (HD) display device with a resolution of 1080p or 1920×1080, and then one pixel on the display can correspond to four pixels in the 4K video. For example, the display device can include output devices of the input/output devices 108 of FIG. 1.

In digital imaging, a pixel, or a pel or a picture element, can include a physical point in a raster image or the smallest addressable element in an all points addressable display device. An address of a pixel can correspond to its physical coordinates.

A local ternarization process can be performed on the local patches 310 by or through the local patch ternarization module 304. After the local ternarization process completes, an "artifact classification" step can be applied by the artifact classification module 306 to determine whether there are any of the residue artifacts 208.

Once the residue artifacts 208 are located and identified, a "removing/smoothing" step can be applied to remove the residue artifacts 208 in the artifact removal module 308. The proposed method above can be used to post-process various images/videos generated by various capture devices, such as cameras, camcorders, smart phones, and tablets, as examples.

The local patch ternarization module 304 selects and processes the local patches 310 of the pixels 312 having certain a predetermined size and a predetermined shape. The size and the shape of the local patches 310 can be determined based on sizes and shapes of the residue artifacts 208 that are estimated or pre-calculated due to the transformation domain methods 210.

The term "size" referred to herein is a number of the pixels 312. The term "shape" referred to herein is information associated with an outer form or a spatial arrangement of a group of the pixels 312.

The local patch ternarization module 304 can calculate mean values 314, denoted as μ, of the local patches 310. Each of the mean values 314 is determined by calculating an average of pixel values 316 of the pixels 312 in each of the local patches 310. The pixel values 316 are numerical values that indicate brightness levels or colors of the pixels 312.

The local patch ternarization module 304 can process the local patches 310 by selecting a ternary threshold 318, denoted as θ, which is a numerical value used by a ternarization process to determine or calculate ternary values 320. The ternarization process is a method of determining and assigning one of three values to each of the pixels 312.

The ternary values 320 are associated with or corresponding to the pixels 312, of which the pixel values 316 are currently calculated. The ternary values 320 include three numerical values of a positive one, a zero, and a negative one (−1). The ternary values 320 can be assigned by comparing the pixel values 316 to a combination of the mean values 314 and the ternary threshold 318.

If the pixel values 316 are larger or greater than sums of the mean values 314 and the ternary threshold 318, denoted as μ+θ, then the local patch ternarization module 304 sets or assigns the ternary values 320 to positive one's (1's). If the pixel values 316 are smaller or less than differences of the mean values 314 and the ternary threshold 318, denoted as μ−θ, then the local patch ternarization module 304 sets or assigns the ternary values 320 of the pixels 312 to negative ones (−1's).

Otherwise, the local patch ternarization module 304 sets or assigns the ternary values 320 of the pixels 312 to zeroes (0's). The local patch ternarization module 304 counts a total number of non-zero ternary values 322, which are the ternary values 320 that are either 1's or −1's inside the local patches 310 after the ternarization process completes.

The artifact classification module 306 identifies the residue artifacts 208 based on several or a number of criterions. For example, the residue artifacts 208 can be identified for wavelet artifacts. Also for example, the residue artifacts 208 can be identified based on the total number of the non-zero ternary values 322 inside the local patches 310.

As a specific example, a count of the total number of the non-zero ternary values 322 inside the local patches 310 less than a non-zero value threshold 324 can identify that the residue artifacts 208 are wavelet artifacts. In this case, corresponding patches or the local patches 310 can have small counts of the non-zero ternary values 322 after the ternarization process completes.

The non-zero value threshold 324 is a numerical value that is used by the Artifact classification module 306 to identify types of the residue artifacts 208. The types of the residue artifacts 208 can depend on transformation domain modes used by the transformation domain methods 210 in the image signal processing blocks 204 that generate the input image 212 and send to the artifact classification module 306.

Patterns 325 of the non-zero ternary values 322 can resemble basis functions or the base functions previously described of the transformation domain modes. For example, the transformation domain modes can include a wavelet transform. In this example, occurrences of the residue artifacts 208 can be isolated. In other words, none of the residue artifacts 208 can have the patterns 325 nearby that are identical. When the residue artifacts 208 are isolated, the residue artifacts 208 are surrounded by the ternary values 320 of zeroes. In other words, the residue artifacts 208 can be surrounded by smooth regions. The image processing system 100 can include a potential or a capability of detecting two or more of the residue artifacts 208 inside the same patch. Therefore, the residue artifacts 208 can have the patterns 325 nearby that are identical.

The patterns 325 are sets of the pixels 312 having similar or same characteristics of other sets of the pixels 312. For example, the patterns 325 can refer to images having similar sets or the same set of the pixels 312 repeated regularly throughout the images. An example of one of the patterns 325 of the residue artifacts 208 will subsequently be described.

The term "nearby" referred to herein is associated with a location of one of the pixels 312 within a predetermined proximity of or a distance from another of the pixels 312. For example, the predetermined proximity can be based on geometrical areas of the local patches 310.

The artifact removal module 308 removes the residue artifacts 208 from the input image 212 to generate an output image 326 for displaying on the display devices 118 of FIG. 1 of the input/output devices 108. Furthermore, the output image 326 can be provided or sent as an input to the following ISP block of the image signal processing pipeline 202 for subsequent processing and eventually displaying by the image processing system 100 or another image processing system. The artifact removal module 308 can include various filtering methods that can be used to remove the residue artifacts 208 once the residue artifacts 208 are identified.

The artifact removal module 308 can replace the pixels 312 affected by or associated with the residue artifacts 208 with the mean values 314 of the local patches 310. For example, in one of the local patches 310, the pixels 312 affected by one of the residue artifacts 208 can be placed with one of the mean values 314 of the one of the local patches 310.

The artifact removal module 308 can replace one of the pixels 312 affected by the residue artifacts 208 with another of the pixels 312 selected nearby the one of the pixels 312. For example, the artifact removal module 308 can replace one of the pixels 312 affected by the residue artifacts 208 with another of the pixels 312, whereby both of the pixels 312 are within one of the local patches 310. Also for example, the artifact removal module 308 can include more sophisticated methods as other replacement methods of the pixels 312 affected by the residue artifacts 208.

For illustrative purposes, wavelet artifacts are used as examples of the residue artifacts 208, although it is understood that the residue artifacts 208 can include any other transform artifacts. For example, the residue artifacts 208 can include other transform artifacts, such as those caused by Fourier transform and cosine transform. Therefore, the suppression of the residue artifacts 208 by the artifact removal module 308 can be applied to any transformation domain methods.

The embodiments as disclosed in the present invention introduce a method to identify locations of the residue artifacts 208 as well as to remove the residue artifacts 208. The residue artifacts 208 can be located after the input image 212 has been processed by the transformation domain modes in the image signal processing pipeline 202.

It has been unexpectedly found that the ternary values 320 calculated based on the mean values 314 of the local patches 310 and the ternary threshold 318 provide more easy-to-work-with data to the artifact classification module 306. The artifact classification module 306 determines whether there are any of the residue artifacts 208 based on the ternary values 320 for removal of the residue artifacts 208 by the artifact removal module 308. After the residue artifacts 208 are removed, the quality of the output image 326 is improved since the residue artifacts 208 are gone.

It has also been unexpectedly found that the non-zero ternary values 322 provide more easy-to-work-with data to the artifact classification module 306. The artifact classification module 306 identifies the types of the residue artifacts 208 based on the total number of the non-zero ternary values 322 inside the local patches 310 less than the non-zero value threshold 324. The residue artifacts 208 are then removed by the artifact removal module 308. After the residue artifacts 208 are removed, the quality of the output image 326 is improved since the residue artifacts 208 are gone.

It has further been unexpectedly found that the pixels 312 affected by the residue artifacts 208 replaced with the mean values 314 provides improved image quality. The improved image quality is provided because after the residue artifacts 208 are identified and replaced, the pixels 312 no longer include the residue artifacts 208 and so the output image 326 is generated with the improved image quality.

Figure 4:
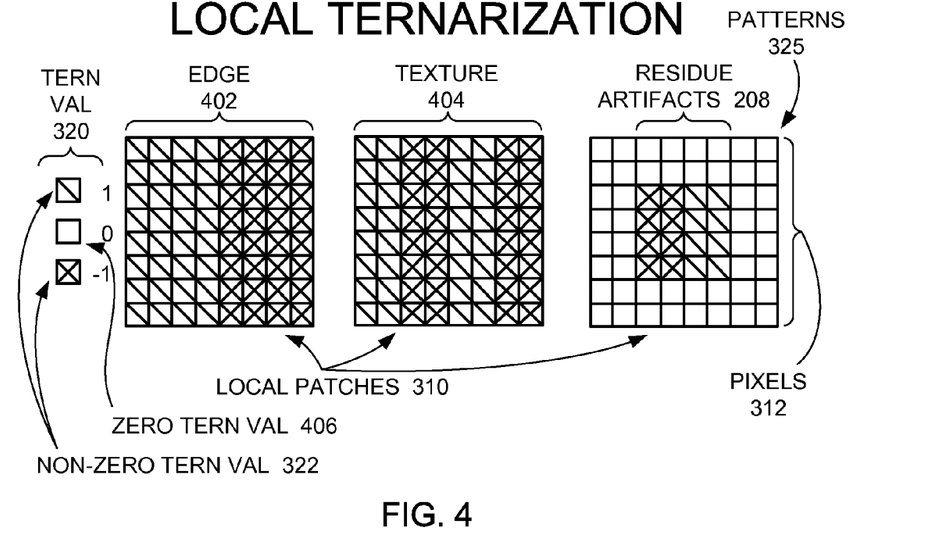
FIG. 4 is an example of one of the local patches with the residue artifacts.

Referring now to FIG. 4, therein is shown an example of one of the local patches 310 with the residue artifacts 208. The example depicts one of the local patches 310 with one of the residue artifacts 208 after the local ternarization process is performed on the local patches 310 by the local patch ternarization module 304 of FIG. 3. For example, after the local ternarization process completes, the artifact classification module 306 of FIG. 3 can classify one of the residue artifacts 208 in one of the local patches 310 as a wavelet artifact.

The example depicts one of the local patches 310 with an edge 402 of an object in the input image 212 of FIG. 2. The example also depicts another of the local patches 310 with a texture 404 in the input image 212. The edge 402 is a portion of the object that is farthest from the object's center, where the object can include any physical element that can be seen and touched as well as any other features in the input image 212. The texture 404 is information about a spatial arrangement of color or intensities in an image or a selected region of an image.

In each of the local patches 310, the example depicts the ternary values 320 of the pixels 312 determined by the local patch ternarization module 304. In the local patches 310 with the edge 402, one portion of the input image 212 is shown with the ternary values 320 of 1's and another portion of the input image 212 is shown with the ternary values 320 of −1.

In the local patches 310 with the texture 404, multiple portions of the input image 212 are shown with the ternary values 320 of 1's and −1's, where multiple portions of the input image 212 with the ternary values 320 of 1's interleaving with multiple portions of the input image 212 with the ternary values 320 of −1's. For example, the local patches 310 with the ternary values 320 shown in the example can represent the ternary values 320 of multiple human hairs that are space apart with the ternary values 320 of 1's representing space and the ternary values 320 of −1's representing the human hairs.

In a smooth region of the input image 212, the ternary values 320 of 0's are shown after the local ternarization process is performed by the local patch ternarization module 304 completes. Edge or texture regions of the input image 212 can include multiple of the pixels 312 determined with the non-zero ternary values 322.

The patterns 325 of the residue artifacts 208 can include the residue artifacts 208 being isolated from each other. For example, one of the patterns 325 can be represented by the pixels 312 with the non-zero ternary values 322 of 1's and −1's corresponding to the residue artifacts 208 surrounded by the pixels 312 with zero ternary values 406, which are the ternary values 320 of zeroes (0's). For example, the residue artifacts 208 can include a wavelet artifact.

Figure 5:
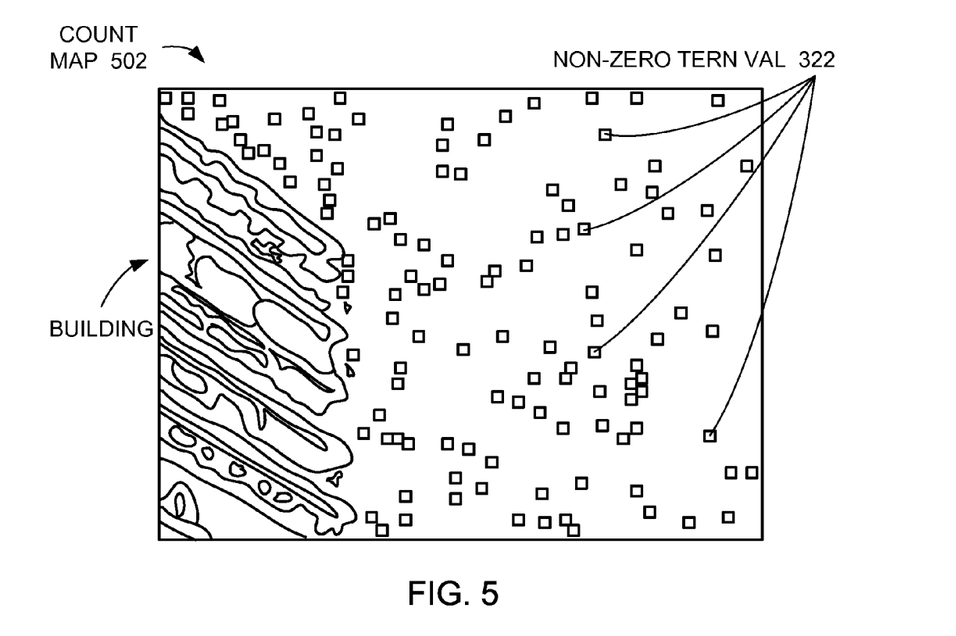
FIG. 5 is an example of a count map of the pixels of FIG. 3 having the non-zero ternary values.

Referring now to FIG. 5, therein is shown an example of a count map 502 of the pixels 312 of FIG. 3 having the non-zero ternary values 322. For example, FIG. 5 depicts a structure or a representation of a building on the left side of the figure.

On the right side of the figure, the count map 502 illustrates locations of the pixels 312 with the non-zero ternary values 322, which are shown with polygons. For example, most of the polygons indicate the locations of most of the pixels 312 with the non-zero ternary values 322.

The pixels 312 with the non-zero ternary values 322 are generated by the local patch ternarization module 304 of FIG. 3 based on the ternary values 320 of FIG. 3 of the pixels 312 in the local patches 310 of FIG. 3. The pixels 312 with the non-zero ternary values 322 include the ternary values 320 of 1's and −1's, which are not 0's.

Figure 6:
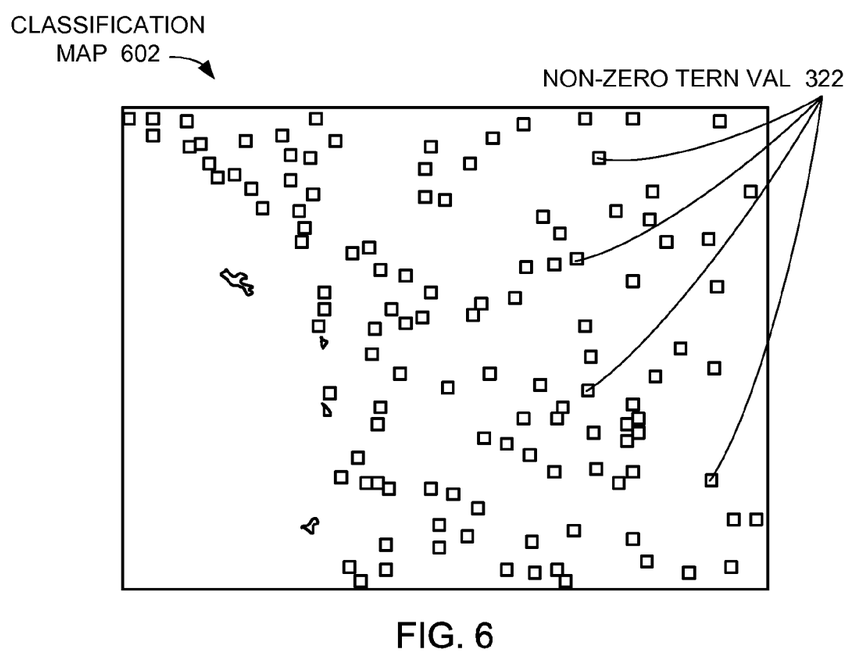
FIG. 6 is an example of a classification map of the image processing system of FIG. 1.

Referring now to FIG. 6, therein is shown an example of a classification map 602 of the image processing system 100 of FIG. 1. The classification map 602 illustrates the locations of the pixels 312 of FIG. 3 with the non-zero ternary values 322.

The classification map 602 can be generated by the artifact classification module 306 of FIG. 3 after the count map 502 of FIG. 5 is generated by the local patch ternarization module 304 of FIG. 3. The classification map 602 can be similar to the count map 502 of FIG. 5, except that the classification map 602 optionally may not include the structure or the representation of the building in the example.

Figure 7:
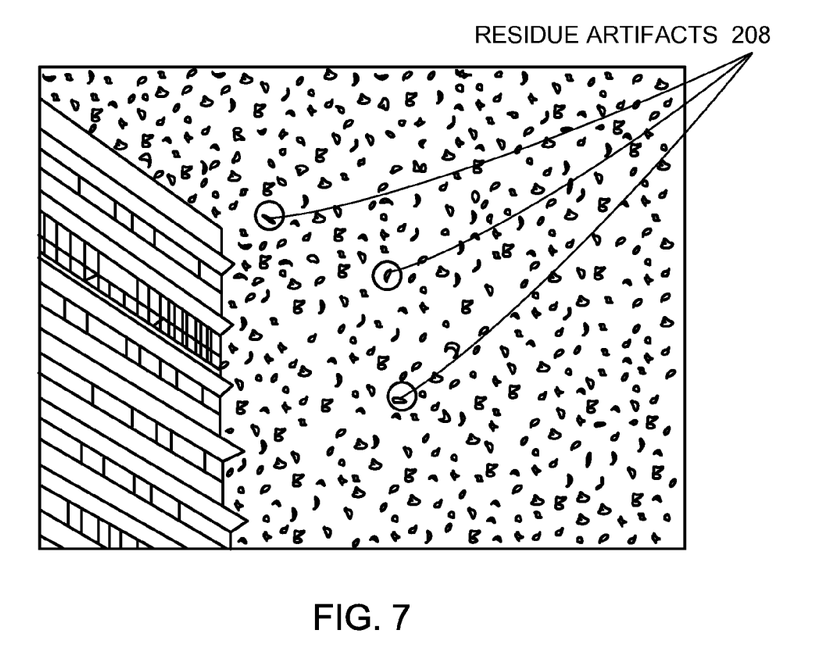
FIG. 7 is an example of the residue artifacts identified by the artifact classification module of FIG. 3.

Referring now to FIG. 7, therein is shown an example of the residue artifacts 208 identified by the artifact classification module 306 of FIG. 3. The example depicts the residue artifacts 208 before the residue artifacts 208 are removed by the artifact removal module 308 of FIG. 3.

For example, the residue artifacts 208 shown in FIG. 7 can include wavelet artifacts. Also for example, there are many of the residue artifacts 208 shown in this example, as indicated by polygons, although only three of the residue artifacts 208 are identified using three circles for illustrative purposes.

Figure 8:
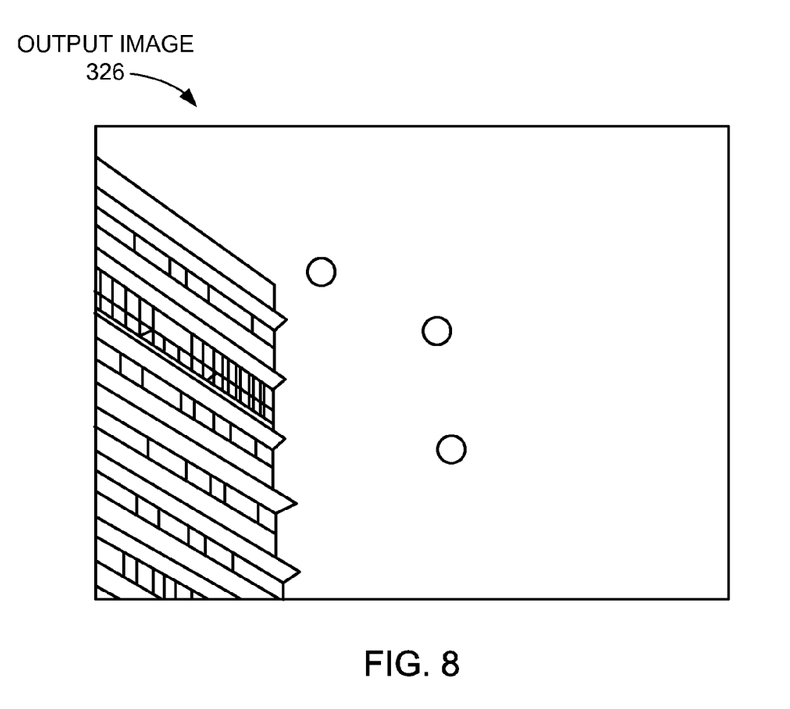
FIG. 8 is an example of the residue artifacts of FIG. 2 removed by the artifact removal module of FIG. 3.

Referring now to FIG. 8, therein is shown an example of the residue artifacts 208 of FIG. 2 removed by the artifact removal module 308 of FIG. 3. FIG. 8 depicts the residue artifacts 208 shown in FIG. 7 removed by the artifact removal module 308. For example, three of the residue artifacts 208 identified by the circles of FIG. 7 are removed as shown by three circles of FIG. 8 for illustrative purposes.

After the artifact removal module 308 removes the residue artifacts 208, the output image 326 can be generated by the artifact removal module 308 without any of the residue artifacts 208. For example, FIG. 8 depicts the output image 326 as a representation of the input image 212 of FIG. 2 without the residue artifacts 208, except that the output image 326 does not include the three circles, which are included only for illustrative purposes.

The physical transformation from physical objects associated with the input image 212 to displaying the output image 326 on pixel elements of the input/output devices 108 of FIG. 1 results in physical changes to the pixel elements in the physical world, such as changes of electrical states of the pixel elements, based on the operation of the image processing system 100 of FIG. 1. As the changes in the physical world occur, such as the motion of the objects captured in the input image 212, the movement itself creates additional information, such as updates to the input image 212, which are converted back into changes in the pixel elements for continued operation of the image processing system 100.

Figure 9:
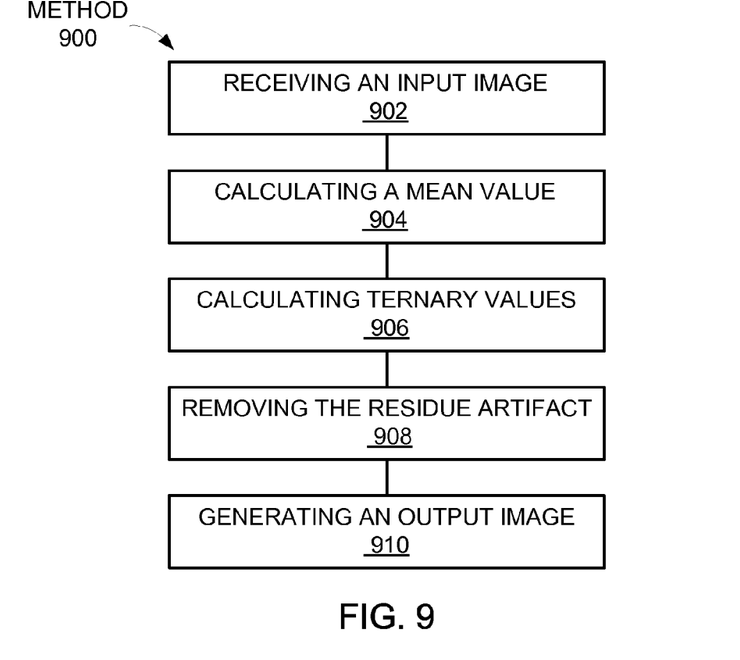
FIG. 9 is a flow chart of a method of operation of an image processing system in a further embodiment of the present invention.

Referring now to FIG. 9, therein is shown a flow chart of a method 900 of operation of an image processing system in a further embodiment of the present invention. The method 900 includes: receiving an input image in a block 902; calculating a mean value of a local patch of pixels in the input image in a block 904; calculating ternary values for the pixels based on the mean value in a block 906; removing a residue artifact based on the ternary values in a block 908; and generating an output image with the residue artifact removed for sending to an image signal processing hardware in a block 910.

Thus, it has been discovered that the image processing system 100 of FIG. 1 of the present invention furnishes important and heretofore unknown and unavailable solutions, capabilities, and functional aspects for an image processing system with an artifact suppression mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving an input image;
   calculating a mean value of a local patch of pixels in the input image;
   calculating ternary values for the pixels based on the mean value;
   removing a residue artifact based on the ternary values; and
   generating an output image with the residue artifact removed for sending to an image signal processing hardware.

2. The method as claimed in claim 1 wherein calculating the ternary values includes calculating the ternary values based on the mean value and a ternary threshold.

3. The method as claimed in claim 1 wherein calculating the mean value includes calculating the mean value by calculating an average of pixel values of the pixels in the local patch.

4. The method as claimed in claim 1 further comprising:
   identifying the residue artifact based on non-zero ternary values of the pixels; and
   wherein:
   removing the residue artifact includes removing the residue artifact identified based on the non-zero ternary values.

5. The method as claimed in claim 1 wherein removing the residue artifact includes removing the residue artifact by replacing the pixels affected by the residue artifact with the mean value.

6. A method of operation of an image processing system comprising:
   receiving an input image;
   calculating a mean value of a local patch of pixels in the input image;
   calculating ternary values for the pixels based on the mean value;
   removing a residue artifact based on the ternary values due to a transformation domain method; and
   generating an output image with the residue artifact removed for sending to an image signal processing hardware.

7. The method as claimed in claim 6 wherein:
   calculating the mean value includes calculating the mean value of the local patch having a size based on the residue artifact; and
   calculating the ternary values includes calculating the ternary values based on the mean value of the local patch and a ternary threshold.

8. The method as claimed in claim 6 wherein:
   calculating the mean value includes calculating the mean value by calculating an average of pixel values of the pixels in the local patch; and
   calculating the ternary values includes calculating the ternary values by comparing the pixel values to the mean value and a ternary threshold.

9. The method as claimed in claim 6 further comprising:
   identifying the residue artifact by a pattern of the residue artifact; and
   wherein:
   removing the residue artifact includes removing the residue artifact identified by the pattern of the residue artifact.

10. The method as claimed in claim 6 wherein removing the residue artifact includes removing the residue artifact by replacing the pixels affected by the residue artifact in the local patch with the mean value.

11. An image processing system comprising:
    a local patch ternarization module for receiving an input image, for calculating a mean value of a local patch of pixels in the input image, and for calculating ternary values for the pixels based on the mean value; and
    an artifact removal module, coupled to the local patch ternarization module, for removing a residue artifact based on the ternary values and for generating an output image with the residue artifact removed for sending to an image signal processing hardware.

12. The system as claimed in claim 11 wherein the local patch ternarization module is for calculating the ternary values based on the mean value and a ternary threshold.

13. The system as claimed in claim 11 wherein the local patch ternarization module is for calculating the mean value by calculating an average of pixel values of the pixels in the local patch.

14. The system as claimed in claim 11 further comprising:
    an artifact classification module, coupled to the local patch ternarization module, for identifying the residue artifact based on non-zero ternary values of the pixels; and
    wherein:
    the artifact removal module is for removing the residue artifact identified based on the non-zero ternary values.

15. The system as claimed in claim 11 wherein the artifact removal module is for removing the residue artifact by replacing the pixels affected by the residue artifact with the mean value.

16. The system as claimed in claim 11 wherein the artifact removal module is for removing the residue artifact based on the ternary values due to a transformation domain method.

17. The system as claimed in claim 16 wherein the local patch ternarization module is for calculating the mean value of the local patch having a size based on the residue artifact and for calculating the ternary values based on the mean value of the local patch and a ternary threshold.

18. The system as claimed in claim 16 wherein the local patch ternarization module is for calculating the mean value by calculating an average of pixel values of the pixels in the local patch and for calculating the ternary values by comparing the pixel values to the mean value and a ternary threshold.

19. The system as claimed in claim 16 further comprising:
    an artifact classification module, coupled to the local patch ternarization module, for identifying the residue artifact by a pattern of the residue artifact; and
    wherein:
    the artifact removal module is for removing the residue artifact identified by the pattern of the residue artifact.

20. The system as claimed in claim 16 wherein the artifact removal module is for removing the residue artifact by replacing the pixels affected by the residue artifact in the local patch with the mean value.

* * * * *